United States Patent
Jennings et al.

(10) Patent No.: US 6,827,855 B2
(45) Date of Patent: Dec. 7, 2004

(54) METHOD OF TREATING SEWAGE

(75) Inventors: Norman Thomas Jennings, Rouse Hill (AU); Darryl Ugo Jennings, Rouse Hill (AU); Garry Gordon Jennings, Rouse Hill (AU)

(73) Assignee: Nremron Pty Ltd., Glenwood (AU)

( * ) Notice: Subject to any disclaimer, the term of this patent is extended or adjusted under 35 U.S.C. 154(b) by 0 days.

(21) Appl. No.: 10/020,309

(22) Filed: Dec. 14, 2001

(65) Prior Publication Data
US 2002/0153302 A1 Oct. 24, 2002

(30) Foreign Application Priority Data
Dec. 15, 2000 (AU) .............................................. PR2115

(51) Int. Cl.⁷ .............................. C02F 3/32; A23L 1/326
(52) U.S. Cl. ....................... 210/602; 426/643; 426/805; 119/227
(58) Field of Search ................................ 210/602, 620, 210/170, 747; 119/227; 426/643, 805

(56) References Cited

U.S. PATENT DOCUMENTS

| | | | | |
|---|---|---|---|---|
| 1,643,273 A | * | 9/1927 | Imhoff | 210/170 |
| 3,635,816 A | * | 1/1972 | Golub | 210/602 |
| 3,886,902 A | * | 6/1975 | Haynes | 119/224 |
| 4,169,050 A | * | 9/1979 | Serfling et al. | 210/602 |
| 4,405,649 A | * | 9/1983 | Jeffreys et al. | 426/59 |
| 5,078,881 A | * | 1/1992 | Augustine et al. | 210/602 |
| 6,447,681 B1 | * | 9/2002 | Carlberg et al. | 210/602 |

FOREIGN PATENT DOCUMENTS

| | | | |
|---|---|---|---|
| EP | 1229003 | * | 8/2002 |
| JP | 62247896 | | 10/1987 |
| JP | 62249059 | | 10/1987 |
| JP | 9298980 | | 11/1997 |
| WO | WO 00/41976 | | 7/2000 |

* cited by examiner

Primary Examiner—Fred G. Prince
(74) Attorney, Agent, or Firm—Fay Kaplun & Marcin, LLP

(57) ABSTRACT

A first holding tank includes a base and a plurality of sidewalls extending upwardly from the base to define an open top. An inlet pipe provides raw sewage into tank. Tank is part of a sewage treatment plant comprised of a number of like sequentially interlinked tanks. Tank has an average depth of about 1½ meters and a surface area of about 60 hectares. After a predetermined volume of sewage and other fluids are contained within tank, the inflow is halted and a number of live fish, in the form of European carp, are introduced into tank. The inclusion of the fish allows the conversion of the sewage into fish manure that progressively builds up on the bottom of the tank. Moreover, the movement of the fish in tank assists the processing of the sewage by aeration.

7 Claims, 3 Drawing Sheets

METHOD OF TREATING SEWAGE

FIELD OF THE INVENTION

The present invention relates to a method of treating sewage and a sewage treatment system.

BACKGROUND INFORMATION

The disposal of human and animal waste is a large problem facing the world community, particularly in locations where population densities are high. In some cases, it is common practice, or at least known, to pump untreated or primary treated sewage into natural waterways or, for coastal cities, the adjacent ocean. Clearly this is an undesirable and unsustainable long-term solution.

In those locations that utilize secondary and tertiary treatment plants for processing the sewage, there are ongoing issues of cost and efficiency. These plants are large in area, are expensive to run, take considerable time to process the sewage, and consume large amounts of energy. Moreover, the improvement or expansion of such plants to cater for growth in populations is extremely capital intensive and can usually only be countenanced by taking a long term approach to seeing a financial return on that capital.

With the increased reluctance to invest more capital in expansion of the treatment plants, those plants are usually run at or near capacity. This increases the risk of accidental releases of raw or partially treated sewage into the waterways downstream of the plant. That, in turn, increases the risk of health concerns for those using those waterways and for the general health of the waterway itself. For example, raw or partially treated sewage is thought to contribute to algae blooms and other undesirable effects in river systems. In other cases, untreated or partially treated sewage is thought to contribute to increased rates of illness amongst beach goers.

Any discussion of the prior art throughout the specification should in no way be considered as an admission that such prior art is widely known or forms part of common general knowledge in the field.

SUMMARY OF THE INVENTION

It is an object of the present invention, at least in a preferred embodiment, to overcome or substantially ameliorate one or more of the disadvantages of the prior art or at least provide a useful alternative.

According to a first exemplary embodiment of the present invention, there is provided a method for treating sewage in a fluid, the method including the steps of:

locating the sewage and the fluid in a holding tank;

releasing live fish into the holding tank; and allowing the fish to consume and otherwise process the sewage whereby a layer of sediment is formed in the tank including waste from the fish.

Preferably, the method includes the step of progressively providing the fluid containing sewage to the tank. More preferably, the method includes the step of providing the fluid containing sewage to the tank at a predetermined rate. In some embodiments, the predetermined rate varies with time.

In a preferred form, the tank includes an overflow path and the method includes the step of continuing to progressively provide the fluid containing the sewage into the tank so that fluid and/or sewage progresses along the overflow path. More preferably, the holding tank is linked to a further tank and the method includes the step of allowing the fluid and/or sewage that progresses along the overflow path to flow into the father tank. Even more preferably, the method includes the step of releasing live fish into the further tank.

Preferably, the method includes the further step of removing the fluid from the tank. More preferably, the fluid is removed progressively over time. Even more preferably the fluid is removed by evaporation.

Alternatively, the fluid is removed once sufficient sewage has been processed by the fish. More preferably, the fluid is removed with any unprocessed sewage.

In a preferred form, the method includes the step of removing the layer of sediment from the tank.

Preferably, sewage and fluid are located in a plurality of tanks containing respective fish, and wherein after a predetermined period of fluid and any remaining sewage are removed from those tanks and placed in other tanks containing additional live fish.

Preferably also, the fluid is water. More preferably, the water is recovered from prior performances of the method described above.

According to a second embodiment of the present invention there is provided a sewage treatment system including a plurality of interlinked holding tanks for sequentially receiving sewage or sewage containing additional fluid and for containing live fish to consume and otherwise process the sewage whereby a layer of sediment is formed in the tank including waste from the fish.

According to a third embodiment of the present invention there is provided a method of producing fishmeal from sewage including the steps of:

introducing fluid into the sewage;

locating the sewage and the fluid in a holding tank;

releasing live fish into the tank; and allowing the fish to consume and otherwise process the sewage whereby a layer of fishmeal is formed in a tank comprising waste from the fish and/or the fish themselves.

According to a fourth embodiment of the present invention there is provided a method for treating water containing sewage, the method including the steps of:

locating the water and sewage in a holding tank;

releasing live fish into the holding tank;

allowing the fish to consume and otherwise process the sewage whereby a layer of sediment is formed in the tank including waste from the fish;

removing the water from the tank.

According to a sixth embodiment of the present invention there is provided a method for producing fishmeal, the method including the steps of:

locating sewage and a fluid in a holding tank;

releasing live fish into the holding tank;

allowing the fish to consume and otherwise process the sewage whereby a layer of sediment is formed in the tank including waste from the fish; and removing the fish from the tank and processing these to produce the fishmeal.

According to a seventh embodiment of the present invention there is provided a method for producing fishmeal, the method including the steps of:

locating sewage and a fluid in a holding tank;

releasing live fish into the holding tank;

allowing the fish to consume and otherwise process the sewage whereby a layer of sediment is formed in the tank including waste from the fish and the fish themselves;

removing the layer from the tank and processing this to produce the fishmeal.

Preferably, the processing includes adding grains to the fishmeal. More preferably, the grains are cereal grains such as wheat or barley.

According to an eighth embodiment of the present invention there is provided a method for treating sewage, the method including:

directing the sewage into a holding tank;

releasing live fish into the holding tank to consume and otherwise process the sewage; and removing the fish from the tank.

Preferably, the fish are removed from the tank at a predetermined period after being released into the tank. However, in other embodiments, the fish are removed from the tank when they are of a predetermined size or weight. More preferably, the predetermined size or weight is based upon an average size or weight. In some embodiments the fish are released into the tank simultaneously and removed from the tank progressively.

Preferably, the fish are European carp and the predetermined period is about two months. More preferably, the predetermined period is about three months.

Preferably also, the holding tank includes a plurality of subdivisions through which the sewage is directed and the method includes the step of releasing live fish into each sub-division and subsequently harvesting the live fish from respective sub-divisions. More preferably, the method includes the step of sequentially releasing live fish into each sub-division More preferably, the method includes the step of harvesting the live fish from respective subdivisions in accordance with the sequence of the release of the fish.

In a preferred form, the method includes the step of progressively directing the sewage to the tank. More preferably, the method includes the step of directing the sewage into the tank at a predetermined rate. In some embodiments, the predetermined rate varies with time.

According to a ninth embodiment of the present invention there is provided a sewage treatment system including a plurality of interlinked holding tanks for receiving sewage and for containing live fish to consume and otherwise process the sewage.

According to a tenth embodiment of the present invention there is provided a method of producing fishmeal from sewage including the steps of:

directing the sewage into a holding tank;

releasing live fish into the tank; and allowing the fish to consume and otherwise process the sewage;

removing the fish from the tank;

processing the fish to provide the fishmeal.

Preferably, the removing of the fish from the tank occurs at a predetermined period after their release into the tank. More preferably, the processing of the fish includes:

drying the fish to kill pathogens;

segmenting the fish to form pieces of fish;

combining the pieces of fish with additives to form a paste or powder; and extruding the paste to form pellets of fishmeal.

Preferably also, the moisture content of the paste is about 10% to 15%. More preferably, the moisture content of the paste is about 11% to 13%. More preferably, prior to the extruding, the moisture content is varied by addition of water to the paste or powder or, alternatively, by drying the paste or powder.

In a preferred form, the pieces of fish are less than or about 1 cm$^3$. However, in other embodiments, the pieces of fish are a different size and, more preferably, smaller.

Preferably, the combining of the pieces of fish with the additives includes agitating the pieces of fish both to encourage intermingling of the pieces with the additives and to further break down the pieces into smaller pieces.

Preferably also, the additives are chosen in response to the end use of the fishmeal.

According to an eleventh aspect of the present invention there is provided a method for treating water containing sewage, the method including:

locating the water and sewage in a holding tank;

releasing live fish into the holding tank;

allowing the fish to consume and otherwise process the sewage; and removing the water from the tank The term "sewage" is intended in this specification and claims to include animal and/or human waste that is of one or more of a solid, semi solid and liquid form. Depending upon the context, that term also includes the water and/or other fluid that has been added to the waste to facilitate its passage through a sewer system. In some embodiments, additional water or fluid is added to the sewage while, in other embodiments, that is not required. For example, in the treatment of human waste, there is usually sufficient fluid, in the form of water, already part of the sewage. That water is added at the source of the sewage to facilitate the progression of the sewage through the sewer system and to the relevant treatment site. For animal waste, such as that generated in piggeries, it is often necessary to add additional fluid, usually water, to assist in the processing provided by the present invention.

DETAILED DESCRIPTION OF THE INVENTION

Figure 1:
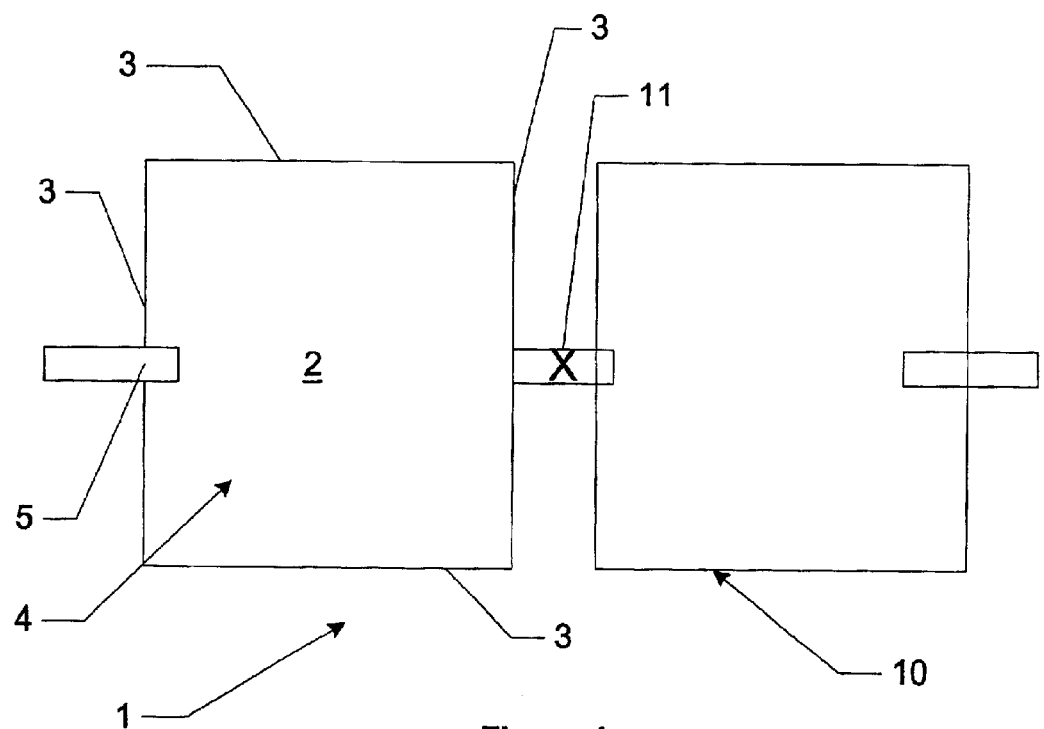
FIG. 1 shows a top view of two holding tanks according to an exemplary embodiment of the present invention.
Figure 4:
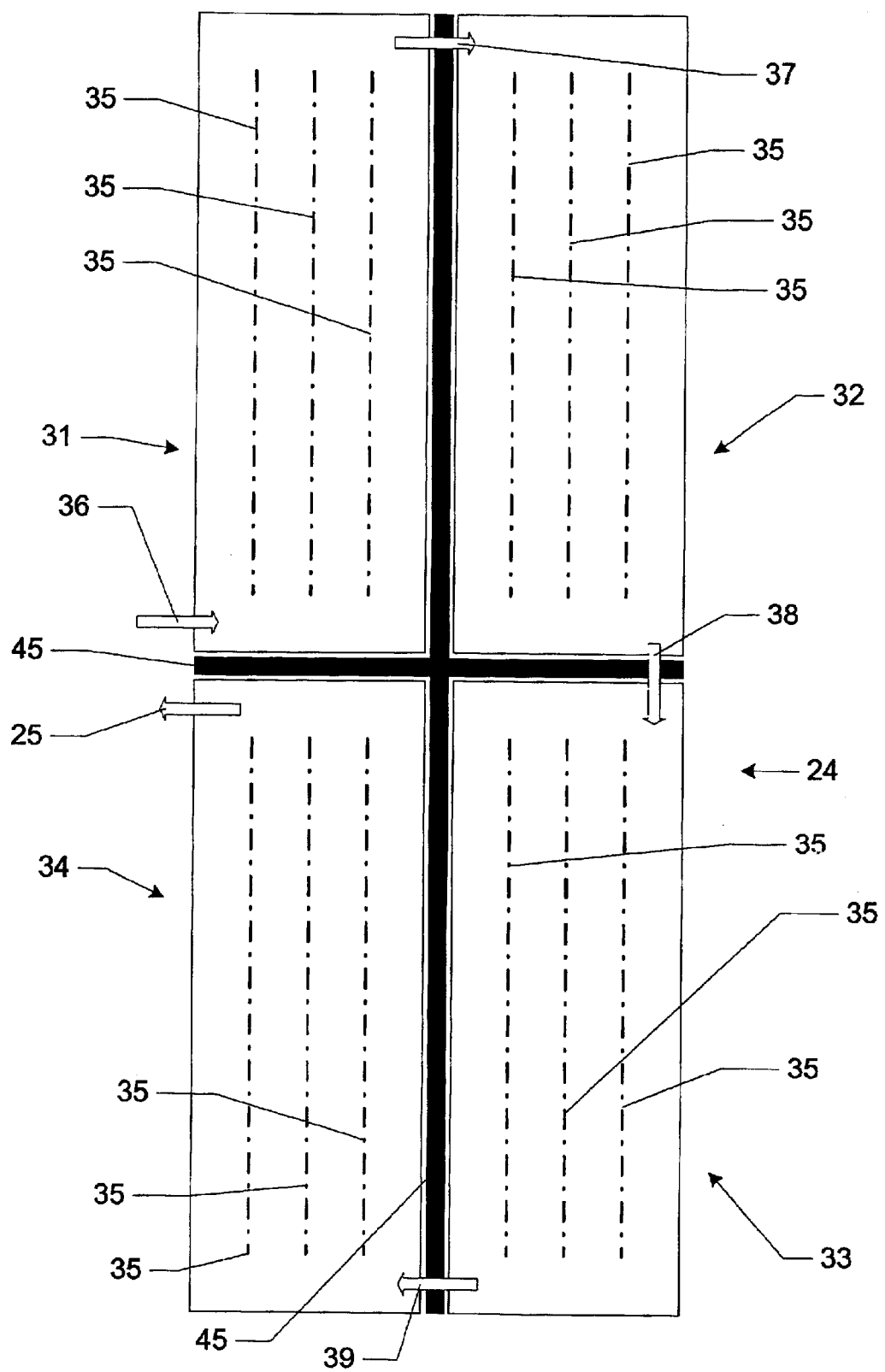
FIG. 4 shows a view of a plant for processing the fish to produce pellets of fishmeal according to the present invention.

FIGS. 1 and 4 show an exemplary embodiment of the present invention. In particular, a first holding tank 1 includes a base 2 and a plurality of sidewalls 3 extending upwardly from the base to define an open top 4. An inlet pipe 5 provides raw sewage 6 into tank 1. While not shown, it will be appreciated that tank 1 is part of a sewage treatment plant may be comprised of six like sequentially interlinked tans.

Tank 1 may have an average depth of about 1½ meters and a surface area of about 60 hectares.

As will be appreciated by those skilled in the art, the sewage contains a certain amount of fluid, in the form of liquid waste, as well as water to ensure the more solid matter travels through the sewerage pipes to the treatment plant. In some exemplary embodiments, the amount of water contained within the sewerage is sufficient, while in other embodiments more water is added to dilute the sewage for optimum processing. This additional water is often required to reduce the concentration of certain elements such as nitrogen.

After a predetermined volume of sewage and other fluids are contained within tank 1 the inflow is halted and a number of live fish are introduced into tank 1. In this embodiment use is made of European carp or the like, which are sufficiently robust to not only survive in the sewage and water mix, but are able to consume sewage and derive sufficient nutrients from this. That is, the fish allow the conversion of the sewage into fish manure that progressively builds up on the bottom of the tank. Moreover, the movement of the fish in tank 1 assists the processing of the sewage by aeration.

European carp are also well adapted for use with the present invention as they can absorb oxygen from the air in the event that the oxygen content of the water is too low. However, it is proposed that the concentration of the carp should be high and the tank shallow so that the movement of the fish will cause agitation and oxygenation of the water.

Figure 2:
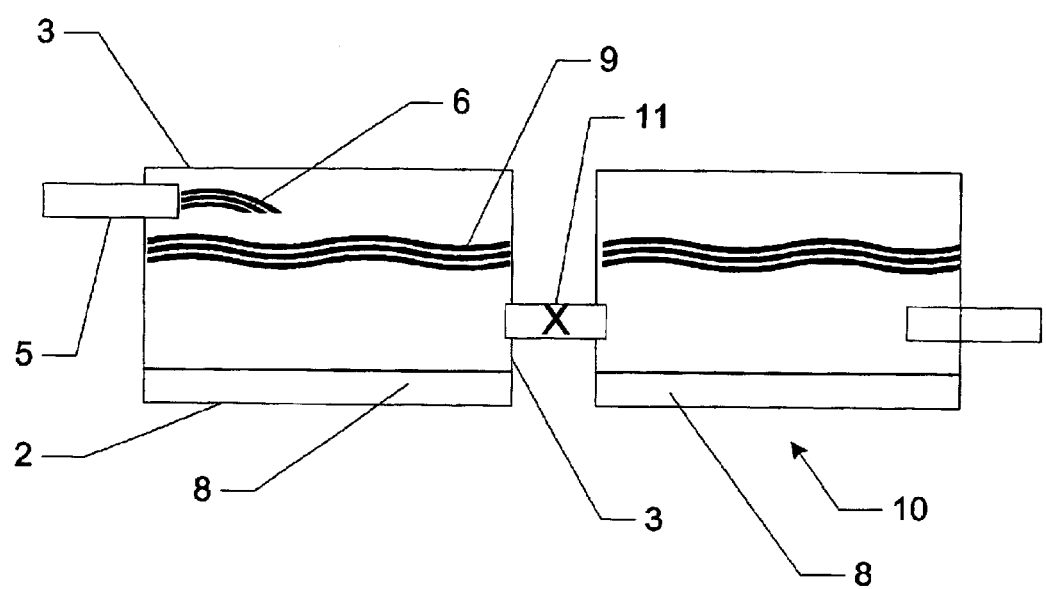
FIG. 2 shows a cross section through the tanks illustrated in FIG. 1.

With time, a layer of sediment 8 accumulates on base 2 comprised of the processed sewage and/or the fish themselves. Once sufficient material has accumulated in layer 8 the remaining water, designated by reference numeral 9 in FIG. 2, is pumped or gravity fed to an adjacent like holding tank 10. Alternatively, water 9 is allowed to slowly evaporate and the fish allowed to become incorporated into layer 8. Tanks 1 and 10 are interlinked by a valve 11 that is selectively opened to allow the flow referred to above.

Once the water is removed the layer 8 can be recovered from base 2 and processed into other products such as fishmeal and on sold as a stock feed supplement or the like. It will be appreciated that as layer 8 will be comprised of fish manure and/or the fish themselves that far fewer subsequent processing problems arise than would be the case with the original sewage that is provided into tank 1.

In some embodiments, layer 8 is recovered prior to removal of water 9. Moreover, in other embodiments water 9 is further processed in tank 10 by additional fish. In either case, once the fish, or the layer that incorporating the fish, is removed, it is subsequently processed to produce fishmeal. This fishmeal is a mix of the fish themselves together with other coarse grains.

It will be appreciated that the concentration of fish within tank 1 is high and preferably in the order of 50 fish per cubic meter of sewage. It would be appreciated by those skilled in the art that in other embodiments alternative concentrations of fish are used.

In larger applications use is made of a plurality of holding tanks in parallel.

In other embodiments, the fish are periodically harvested. In the case of European carp, the harvesting is for the purposes of producing fishmeal from the carp.

That is, the present invention allows the processing of sewage to result in a high protein fishmeal that can be used to feed other fish or marine life—such as those farmed for human consumption.

In some exemplary embodiments, the present invention is used as a second stage treatment of sewage, with the prior first stage treatment removing about half of the solid matter within the sewage as well as reducing the concentration of nitrogen and other elements to level that will allow the habitation of fish within the sewage. Generally, raw sewage contains about 20% solids.

In a further embodiment of the present invention, the water and sewage is progressively feed through a sequence of the tanks each of which contains high concentrations of European carp. The water that is released from the last of the tanks is, in this embodiment, suitable for release back into the environment. In some embodiments, however, the water requires further processing. This is dependent upon the nature of the sewage and the effectiveness of the fish in processing that sewage.

The progressive flow of the water and sewage is maintained for a long period, presently envisaged as being in the order of two to four years. In this period the fish are harvested and replaced, as required. At the end of the period the fish are removed from the tanks and the remaining liquid being removed or allowed to dry so that the sediment remaining at the bottom of the tanks can be easily removed. This sediment is then used as a fertilizer or supplement for soil.

The progressive flow of water and sewage is then recommenced into the tank and additional fish released into the tank to recommence the process.

That is, the preferred embodiments of the present invention offer two distinct alternatives to creating the fishmeal, these being:

1. Having a continuing flow of sewage through the tank and periodically harvesting the fish for processing into fishmeal; or
2. Having the flow of sewage segmented and allowing the fish to incorporate into the layer on the bottom of the tank, and subsequently retrieving and processing that layer to provide the fishmeal.

Figure 3:
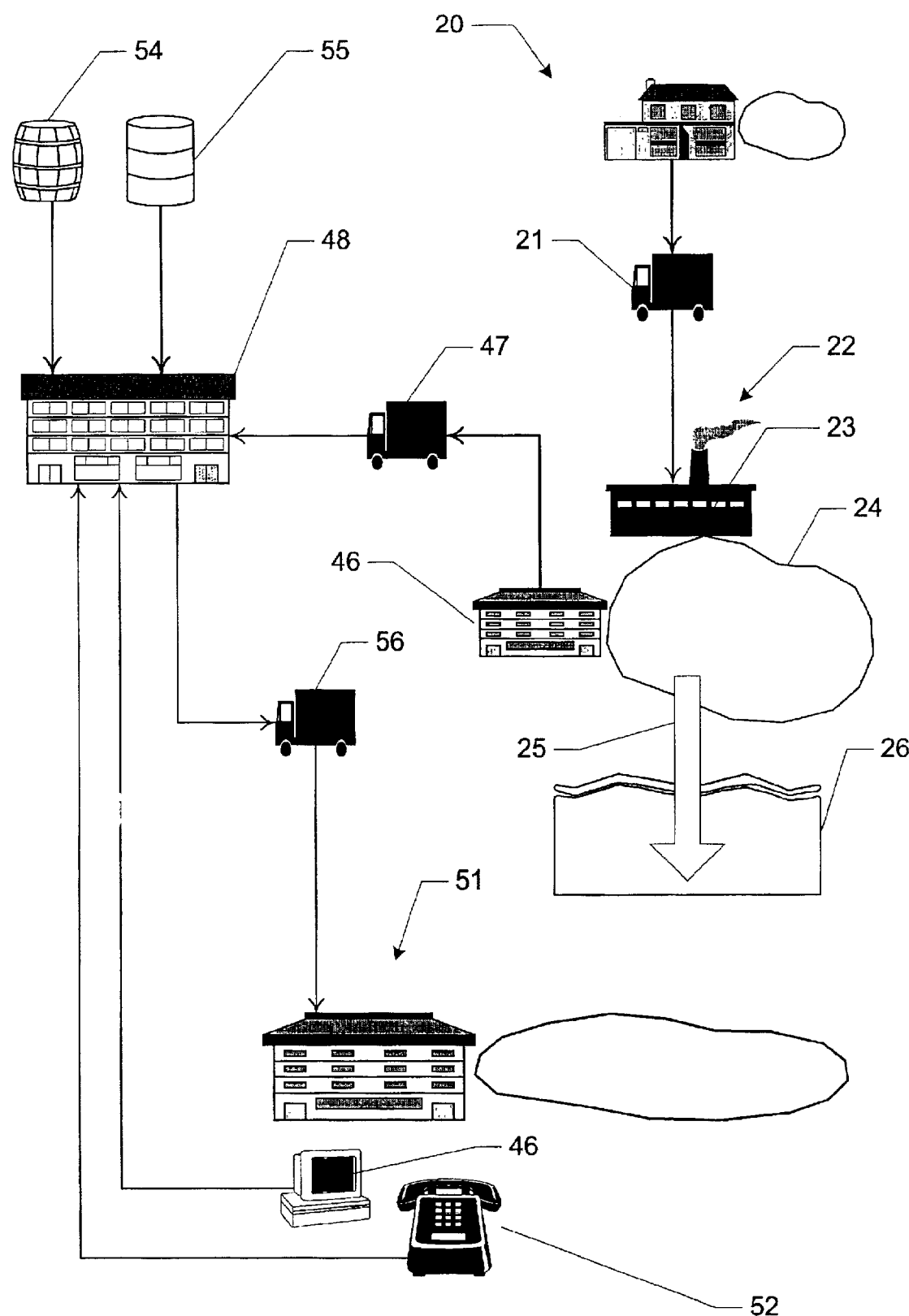
FIG. 3 shows a top view of an alternative embodiment of the present invention.

FIG. 3 illustrates schematically a further exemplary embodiment of the present invention. More particularly, the process is commenced at a hatchery 20 where fish eggs (not shown) of the desired species are hatched. In this example, the fish are common European carp, although many other alternatives are available. Some other species that have been found well suited to this embodiment are oriental carp, trench, mora rainbow fish, and black bream.

For the common European carp, the hatchlings are allowed to grow, under controlled conditions, into fingerlings that are about 75 mm to 100 mm long. At this stage, the fingerlings are moved to a growth area (not shown) in hatchery 20 where they are subject to increased water temperatures and feed volumes to accelerate their growth until they are about 120 mm long. It will be appreciated that there will be a statistical variation in length of the fingerlings at all stages and the abovementioned lengths are not prescriptive of individual animals but rather indicative of averages across a large sample.

A typical time between the hatching of the eggs and the growth of the fingerlings to about 120 mm in length is about 3 months. The intention is to ensure that the fingerlings are old enough to be sufficiently robust to withstand the part they are to subsequently play in the processing of sewage, but at a point just prior to their major growth phase. Given this, it is possible that the above time frames will be, in other embodiments, considerably different particularly if different animals are used or if other variables such as water temperature, feed rates, and hatchery densities are varied.

Once the European carp fingerlings are about 120 mm in length, they are transported, in this embodiment by truck 21, to a sewage treatment plant 22. In other embodiments, alternative means of transportation are used. Moreover, in some embodiments, hatchery 20 is adjacent to or part of plant 22 and, as such, minimal transportation is required.

Plant 22 is preexisting and is for the treatment of human sewage. The plant includes an initial processing complex 23 that effects removal of large solid material from the sewage that is feed into plant 22. This large solid material is substantially organic and usually constitutes less than one percent of the volume of the sewage. In this embodiment, where human waste is being processed, complex 23 passes 99.81% of the sewage received onto the next phase of treatment.

Following this initial treatment, the sewage is then passed into a pond system 24, which will be described in more detail below. The pond system includes many interlinked ponds that are about 1 to 1.5 meters deep and which have a combined total surface area of about . . . hectares. The sewage flows sequentially through system 24 prior to exiting at an outlet 25. The dwell time of the sewage in system 24 is about six to ten days. By the time the sewage reaches the outlet it is so treated as to be able to be released into the general environment In this case, the sewage that progresses through outlet 25 is released into a body 26 of water. While in this embodiment body 26 is an ocean, in other embodiments it is a river or other waterway. In some embodiments the outlet feeds into further settling ponds where the treated sewage resides prior to being released into body 26.

As shown in FIG. 4, system 24 includes four interconnected ponds 31, 32, 33 and 34. Additional ponds are included in other embodiments. Each of the ponds is about 1.2 meters deep and segmented by three parallel 1.5 meter high walls 35. These walls are made of a plurality of adjacent solid plastics panels that are each about 4 meters in length. The panels are retained in the ponds by an array of poles (not shown), where each panel extends between two adjacent poles.

Walls 35 define channels within each of the ponds through which the sewage flows. Additionally, the walls provide a site for attachment of a plurality of nylon nets (not shown) that further segment the channels into a number of compartments for containing live fish. That is, the nets are connected to two adjacent posts and extend down the wall, across the bottom of the channel, and up the other wall. Use is made of nylon nets due to their durability and rot resistance.

Sewage is delivered into pond 31 through a conduit 36. In some embodiments, this conduit includes a regulator for metering the flow of the sewage into the pond.

Once in pond 31, the sewage progresses through the channels before passing through a conduit 37 and into pond 32. A similar progression occurs with pond 32, 33 and 34 and associated conduits 38 and 39. After the sewage moves through the channels of pond 34 it leaves via outlet 25.

The ponds are separated by intermediate access roads 45.

Each of the nets within the channels defines a maturation pond for the live fish that are delivered to plant 22. That is, upon delivery, a predetermined quantity of fingerlings are released into one or more of the compartments. The apertures in the nets are such as to minimize the risk of the fingerlings being able to move between adjacent compartments.

For the European carp of the present embodiment, the quantity of fingerlings that are released into each compartment is about 0.5 kg/m$^3$. While there is considerable variation between compartments, typical depth, length and width dimensions for a compartment in this embodiment are 1.2 m×4 m×5 m. That is, such as compartment has a volume of about 24 m$^3$ and, as such, about 12 kg of live animals are released into the compartment. At the time of release, the animals are about 120 to 160 grams, which results in the compartment containing about 75 to 100 animals.

With all the compartments so stocked with animals, the sewage is processed by those animals consuming the solids and as well as the dissolved nutrients that are contained within the sewage.

European carp are bottom feeders and are preferred as not only do they consume and otherwise process the solids and nutrients contained within the sewage itself, but they also stir the sediment contained on the bottom of the compartments to such an extent that it is retained in the flow of sewage through the pond system. This agitation and aeration of the sewage also assists other subsidiary processing. Particularly, the processing of the sewage is facilitated by sunlight that impinges upon the surface of the ponds. The agitation of the flow by the animals allows more of the water to be circulated through the upper levels of the ponds and thereby increases the uniformity of the treatment provided by the sunlight.

Alternative embodiments make use of compartments that have nets that keep the fish away from the bottom of the ponds. This need arises in some pond systems where the pond bottom is too easily disturbed and, if the fish did have access to it, the sewage would be so muddied as to prevent sufficient sunlight from entering the sewage. The penetration of sunlight has the added advantage of encouraging algae growth, which is also consumed by the fish.

In some embodiments use is made of alternative species of animals. In further embodiments, use is made of a combination of species. For example, in addition to the bottom feeding carp referred to above, some embodiments use mid line feeders such as Mora rainbow fish or black bream. Another example includes the use of top line feeders such as oriental carp or trench. It will be appreciated that the top line feeders need not be so robust, as the conditions in the upper level of the sewage will be far less severe than at the lower levels due to the action of the sunlight referred to above. In the case of the animal, the sunlight is advantageous as it also helps in killing pathogens in the sewage. Accordingly, many more species of animal are applicable in the upper levels.

In some embodiments, each compartment includes bottom feeders, mid line feeders and top feeders.

After about three months following the release of the European carp into the compartments in a temperate environment, those carp will have grown to an average size in the order of 200 to 250 mm. In colder environments and with lower concentrations of sewage the growth rates will be less. Additionally, other species of animal will have different growth rates.

At this time, the animals are harvested, in that they are removed from the compartments. In practice, this achieved by drawing together the top edges of the relevant net, and lifting it out of the pond, together with the entrapped animals. This net is then loaded onto a transport vehicle and taken to a warehouse 46 that is located adjacent to pond system 24. Access roads 45 facilitate this transport step.

Once the net has been removed from the relevant pond, a new net is secured to walls 35 and/or other securement points to redefine the respective compartment. A fresh batch of fingerlings from hatchery 20 are then released into the redefined compartment. This process of removal of the more mature animals and the subsequent release of the fingerlings is respectively referred to as harvesting and sowing.

In other embodiments, the net is draw together and removed from the compartment and immediately emptied into a truck mounted bin or container. Thereafter, the net is again secured to define the compartment and restocked with new fingerlings, as described above.

The rationale for harvesting the animals from the compartments after three months is because their growth rate is beginning to slow considerably. Accordingly, it is more beneficial—from both a sewage processing and an animal tonnage point of view—to have younger animals replace the more mature animals.

In this embodiment the harvesting and sowing occurs on a rotation basis so that a continuous and sequential process is instituted for system 24. However, in some embodiments, the growth rate of the animals is not uniform across all compartments and selective harvesting is used. For example, where different compartments contain different animals, different combinations of animals or different concentrations of animals. Non-uniform growth rates also occur where there is an unequal distribution of fresh sewage to the compartments. So, for the compartments in pond 34, the animals generally experience a slower growth rate than the animals in pond 31. Another factor that affects growth rates between compartments is the flows of the sewage through the ponds. In some cases there are hydrodynamic "dead zones" where the sewage is relatively stagnate and, as such, there are less solids and nutrients made available to the animals. In some embodiments use is made of baffles and other flow adjustment devices that are placed in the ponds to ensure that all compartments receive the flow of sewage that is required to affect the desire uniformity of growth between the compartments.

Once taken to warehouse 46, the carcasses of the harvested animals are centrally inspected. This inspection includes weighing, sampling for pathology testing, sorting, tagging and other data collection. Other quality control operations are also performed at this point.

Those carcasses to be further processed are transported, in this case by a truck 47, to a fishmeal processing plant 48. Preferably, this transportation occurs as soon as practically possible after the harvesting and inspection of the animals.

The carcasses are loaded onto a wire mesh conveyor (not shown) and passed through a heating system to kill any remaining pathogens in the animals. This heating also has the effect of drying the animals. The removal of fluids in this controlled way also allows the removal of heavy metals and other undesirable materials and diseases that, if present, are contained predominantly within the fluids of the animals.

It is typical for the heating and drying to result in a 30 to 40% weight reduction from the carcasses provided.

It is preferred that use is made of a "dry" process to better ensures the elimination of pathogens.

After the heating process it is usual to conduct additional inspection of the animals. This includes a visual inspection as well as pathology testing for pathogens, viruses or other undesired life forms.

The dried carcasses, in their entirety, are then cut or shredded into thin pieces of about 1 cm$^2$. In other embodiments, the shredding is to a different size.

The fish pieces include all the bone, gut, skin and flesh of the carcasses. In other embodiments, however, one or more of these constituents are removed, although prior to the drying process.

The pieces are combined with measured proportions of additives to form a fishmeal mix that is stockpiled in plant 48 until the moisture content of the mix is about 12% by weight. Usually this will take about two or three days although, in some cases, two to three weeks is required. To assist the drying it is possible to periodically tun the stockpile. A less preferred alternative is to include within the mix an additive comprised of dry powder or sawdust. The longer time the mix is in the stockpile also allows a greater breakdown of the fish pieces.

In other embodiments the target moisture content of the mix is in the range of 10 to 15%. The selection of the target will be dependent upon the desired storage life of the product, as the less moist mix will keep longer.

The additives that are included within the mix are dependent upon the intended use of the resultant fishmeal. Examples of such additives include crushed cereal grains, powdered vitamins, powdered proteins (due to the loss of protein that occurs during the drying process), and dietary fibre or other roughage. In this embodiment, the resultant meal is intended for feeding to other animals and, in particular, to a specific species of fish. Accordingly, the additives are commonly, wheat, barley & other heavy seed supplements, together with specific vitamin and minerals for the fish species. In other embodiment, such as for pig feed, the additives are typically of similar categorization, although in different proportion. It will be appreciated, from the teaching herein, that many other additives and combinations of additives are available.

The stockpiled mix, once having the required moisture content, is extruded at high pressure through a die having a diameter of about 5 mm. Because of the low moisture content the extruded material forms into fishmeal pellets of varying size. If required, the pellets are graded for size. In other embodiments the pellets are passed through a set of rollers to provide greater uniformity of pellet size.

In other embodiments different diameter dies are used.

The pellets are packaged in bags, boxes or other containers and stored temporarily for transportation to customers.

As mentioned above, in this embodiment, the fishmeal pellets are intended as feed for fish. By way of example, a customer having an aquacultural enterprise 51 places an order for the desired pellets by way of telephone 52 or computer 53 which is connected to the internet or other network. Where computer 53 is used, provision is made for the customer to specify and particular requirements or characteristics that the resultant pellets must have. This could include the inclusion of certain vitamins or protein content or otherwise.

In response to the order, the operator of plant 48 determines if the existing stocks of additives 54 and 55 are sufficient and, if so, commences production of the required pellets. Once so produced, the pellets are packaged and transported by truck 56 to enterprise 51.

Prior art fishmeal has traditionally only included the discards of the fish, such as the scales and guts. As the fishmeal pellets of the present invention are formed from the whole carcass of the fish they are comparatively high in protein content.

In some embodiments, the harvested fish are for human consumption. Generally, such fish are top feeders and undergo additional testing following the harvesting to provide greater assurance to the intended consumers of their fitness for purpose.

Accordingly, the three main applications of the harvested fish in the preferred embodiments of the present invention, as presently envisaged, are:

1. as a base ingredient in manufacturing aquacultural products;
2. as a base ingredient in manufacturing agricultural products; and
3. after appropriate quality testing, for human consumption.

The use of the fish as a base for aquacultural products provides a quick growth, high protein meal. Moreover, the ease at which additives are accommodated into the manufacturing process allows the customer to quickly and conveniently tailor the meal to the required task. Similar comments apply to the use of the fish as a base ingredient for agricultural products, as the requirements for pig feed will be substantially different to that of a soil fertilizer.

The preferred embodiments of the present invention provide a systematic and environmentally sustainable means of treatment of sewage as well as a method of producing fishmeal in a cost effective and resource effective manner.

The present invention has been developed primarily for use with sewage comprised of human waste and will be described hereinafter with reference to that application. However, those skilled in the art would understand that the present invention is not limited to that particular field of use and is also applicable to the processing of animal waste and other organic waste.

Although the present invention has been described with reference to a specific example it will be appreciated by those skilled in the art that it may be embodied in many other forms.

What is claimed is:

1. A method for producing fishmeal from sewage, comprising the steps of:
    providing fluid into the sewage;
    introducing the sewage and the fluid into a holding tank;
    releasing live fish into the holding tank to consume and process the sewage; and
    collecting a layer of fishmeal in the holding tank, the layer including at least one of (i) a waste from the fish and (ii) the fish.

2. A method for producing fishmeal, comprising the steps of:
    introducing sewage and a fluid into a holding tank;
    releasing live fish into the holding tank to consume and process the sewage;
    collecting a layer of sediment in the holding tank, the layer including (i) waste from the fish and (ii) the fish;
    removing the layer from the holding tank; and
    processing the layer to produce the fishmeal.

3. The method according to claim 2, wherein the processing step includes the substep of adding grains to the fishmeal.

4. A method for treating sewage, comprising the steps of:
    introducing the sewage into a holding tank, the holding tank includes a plurality of sub-divisions through which the sewage is directed;
    releasing live fish into the holding tank to consume and process the sewage;
    removing the fish from the holding tank;
    releasing live fish into each sub-division; and
    subsequently harvesting the live fish from respective sub-divisions.

5. A method for producing fishmeal from sewage, comprising the steps of:
    introducing the sewage into a holding tank;
    releasing live fish into the holding tank to consume and process the sewage;
    removing the fish from the holding tank; and
    processing the fish to produce the fishmeal,
    wherein the processing step includes the substeps of:
        drying the fish to kill pathogens;
        segmenting the fish into pieces;
        combining the pieces with additives to form one of a paste and a powder; and
        extruding one of the paste and the powder to form pellets of fishmeal.

6. The method according to claim 5, wherein a moisture content of the paste is in range of about 10% to 15%.

7. The method according to claim 5, wherein a moisture content of the paste is in range of about of 11% to 13%.

* * * * *